April 9, 1929.  N. A. CHRISTENSEN  1,707,975

VEHICLE BRAKE

Filed Sept. 17, 1926

INVENTOR.
Niels A. Christensen
BY
Quarles & French
ATTORNEYS

Patented Apr. 9, 1929.

1,707,975

UNITED STATES PATENT OFFICE.

NIELS A. CHRISTENSEN, OF CLEVELAND, OHIO.

VEHICLE BRAKE.

Application filed September 17, 1926. Serial No. 136,161.

The invention relates to brakes, and more particularly to those for automotive vehicles and trailers for such vehicles.

One of the objects of the invention is to provide an efficient and readily accessible means for adjusting the clearance of the brake member, more particularly by the use of an eccentric associated with the brake member and adapted to be held in different positions of angular adjustment.

A further object of the invention is to provide a brake construction embodying a lever interposed between the actuator and the brake member with a thrust member associated with this lever and adjustably connected to the brake member which readily permits of a wide range of leverage connections between the actuator and the brake member without impairing the efficiency of operation of the parts.

The invention further consists in the several features hereinafter set forth and more particularly defined by claims at the conclusion hereof.

In the drawings Fig. 1 is a view of a brake equipped with the brake mechanism embodying the invention, the view being taken as a section looking into the brake drum;

Figure 1:
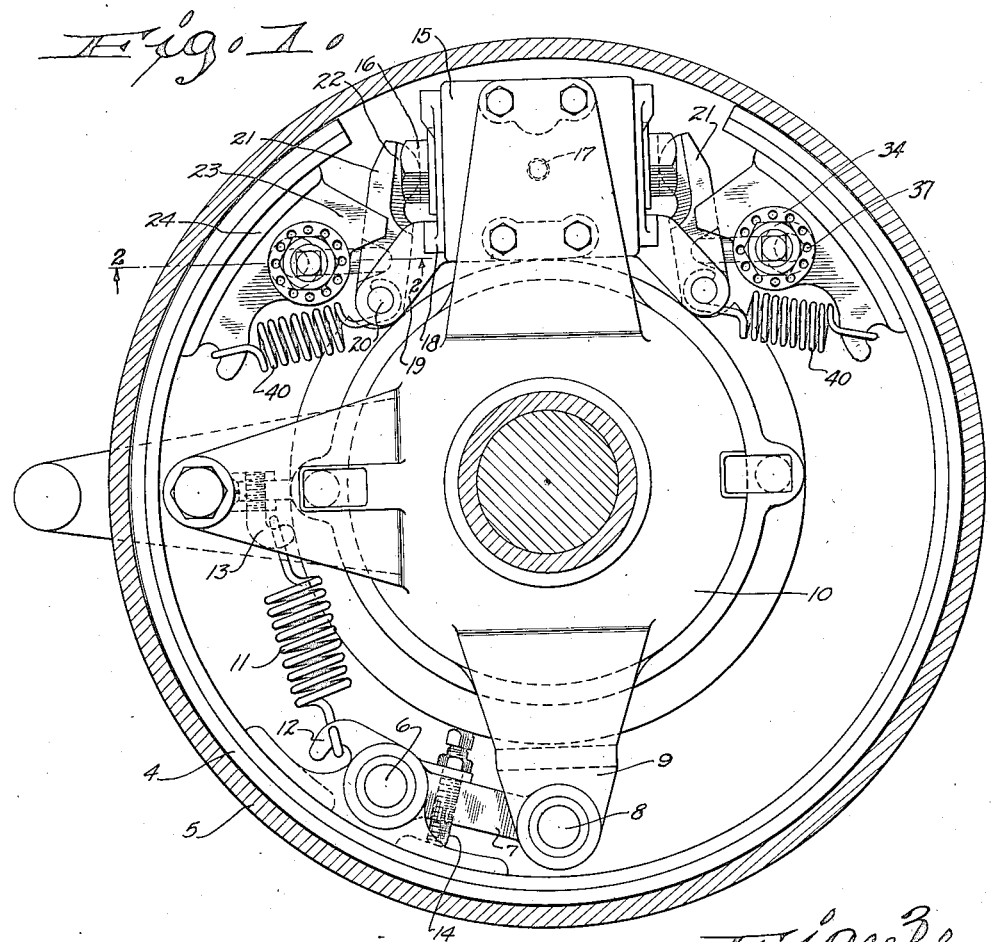

While the brake may be of any suitable construction, for the purpose of illustration I have shown a brake member 4 in the form of a band engageable with the brake drum 5 and connected intermediate it sends by a pin 6 to an anchor pin link 7 which in turn is connected by a pin 8 to a bracket member 9 on a brake support 10 adapted to be secured to the vehicle against rotation. As shown, the intermediate portion of the band is maintained in a release position by a spring 11 connected at one end to a projection 12 on the link and at its other end by a hook bolt 13 to the brake support, said spring causing the movement of the intermediate part of the band against an adjustable fixed stop, here shown in the form of a set-screw 14 carried by the link 7.

The actuator here shown includes a fluid-pressure-operated motor 15 having suitably packed pistons working therein in opposite directions, not shown in detail, and having piston rods with external heads 16 which move outwardly when pressure fluid is introduced into the brake cylinder through a central port 17.

The heads 18 of the brake cylinder have lugs or ears 19 formed thereon, each head carrying a pin 20 forming the pivotal support for the multiplying lever 21. This lever 21 has a flattened outer end 22 engageable in a slot in the head 16 of the piston rod so as to maintain these parts in alinement and as shown works between two guide lugs 23 formed as a part of a brake lug member 24, and a thrust member 25 is interposed between the lever 21 and each free end of the band. As shown this thrust member has a hemispherical end 26 seated in a conical recess 27 in the lever 21 and intermediate the pivotal supporting point of the lever and its outer end. This thrust pin fits over an eccentrically disposed pin 28 formed as a part of a shaft 29 journalled in a boss 30 formed as a part of the member 24 and having a threaded portion 31, upon which a locknut 32 is mounted, and a square outer wrench-engaging end portion 33. The trust member 25 abuts against the shaft 29 on one side and is held against longitudinal movement on the eccentric pin by a washer 25' and cotter pin 26'.

Assuming that the shaft 29 is held in fixed position relative to the lug 30, it will be noted that when the piston rod 16 moves outwardly the levers 21 move outwardly and in turn move the thrust members 25 outwardly, thus moving the free ends of the band into engagement with the drum and by this action also causing the intermediate portion of the band to move into braking engagement with the drum, the leverage connection herein shown providing a greater braking force than the pressure applied by the fluid-pressure-operated motor.

As the brake lining wears down provision must be made for taking up the increased clearance, and for this purpose means have been provided for permitting the eccentric member 28—29 to be locked in various positions of adjustment relative to the brake member. As shown, this means consists of a plate 34 fitting over the threaded portion 31 of the shaft 29 and provided with an inwardly extending lug 35 forming a projection engageable in a spline 36 formed in the threaded portion 31 of the member 29, said plate also having radially disposed holes 38 into any two of which diametrically disposed pins 37, secured in the boss 30, engage. By this construction, loosening the nut 32, which is here shown as a castellated head locked by a pin 39 in the usual manner, so as to permit disengagement of the pins 37 from the boss 30, permits the operator to turn the eccentric member 28—29 by engaging the square end 33 with a suitable wrench so as to move the crank or eccentric pin 28 to such a position as to maintain the proper working clearance to such an amount as to bring the thrust member 25 and lever 21 into a relation to maintain the proper working clearance between the brake member and the drum, the eccentric connection having the effect of decreasing or increasing the distance of the lever 21 from the brake lug 24.

Figure 2:
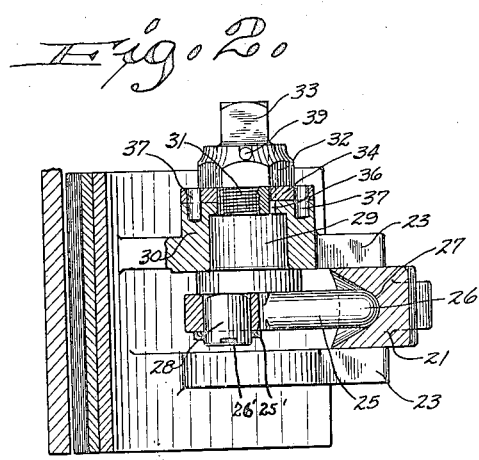
Fig. 2 is a detail sectional view taken on the line 2—2 of Fig. 1.
Figure 3:
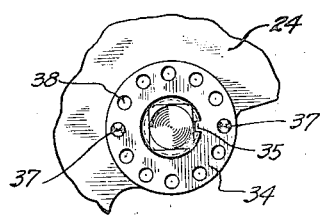
Fig. 3 is a detail front end view of parts of the brake.

When the shaft 29 has been turned to the desired position the plate 34 is slid inwardly along the threaded portion 31 of the shaft 29 so as to bring the pins 37 into register with one set of holes 38 on the boss 30, and since the plate also has a splined connection with the shaft the screwing back of the nut 32 to a position shown in Fig. 2 locks the plate to the boss 30 and the plate in turn locks the shaft 29 and the eccentric pin 28 against rotation relative to the brake lug 24 and thus the parts are secured in adjusted position. It is to be noted that the adjustment in this case is effected from the side of the brake drum so that the brake may be conveniently adjusted by the operator.

It is also to be noted that by the use of a thrust member interposed between the brake and the lever that the thrust member may be made to engage at any point between the outer end of the lever and the pivotal support thereof.

As previously explained, the outward movement of the pistons, including the piston-rod 16, moves the brake member into engagement with the drum, and in addition to the spring 11 previously noted a spring 40 connects each free end of the band with the brake support, as by its connection with the pin 20, so that the spring 40 and the spring 11 act upon the band to move it to a release position upon the exhaust of pressure from the motor.

I desire it to be understood that this invention is not to be limited to any particular form or arrangement of parts except in so far as such limitations are specified in the claims.

What I claim as my invention is:

1. In brake mechanism of the character described, the combination of a brake drum, a brake member engageable therewith, of means for moving said brake member into engagement with said drum, including a thrust member, an eccentric member mounted on the brake member and connected with said thrust member, and means including a plate having splined connection with the eccentric and adjustable non-rotatable connection with said brake member to lock said eccentric against rotation.

2. In brake mechanism of the character described, the combination with a brake drum and a brake member engageable therewith, of means for moving the brake member into engagement with the drum comprising a thrust member, a shaft upon which said thrust member is eccentrically mounted, said shaft being journalled in a part of said brake member and having a threaded portion with a wrench-engaging end, a locking plate splined to said shaft and lockingly engageable in a plurality of positions with said brake member, and a nut mounted on the threaded portion of said shaft for holding said plate in adjusted position.

3. In brake mechanism of the character described, the combination of a rotatable brake drum and a brake member engageable therewith, of an actuator, a relatively fixed support, a lever pivotally mounted on said support having its free end engageable with said actuator, a thrust member contacting with said lever between its point of pivotal support and said actuator, and an adjustable eccentric connection between said thrust member and brake member.

In testimony whereof, I affix my signature.

NIELS A. CHRISTENSEN.